United States Patent
Shukla et al.

(10) Patent No.: US 11,936,677 B2
(45) Date of Patent: Mar. 19, 2024

(54) SYSTEM AND METHOD FOR ASSESSING INSIDER INFLUENCE ON ENTERPRISE ASSETS

(71) Applicant: Tata Consultancy Services Limited, Mumbai (IN)

(72) Inventors: Manish Shukla, Pune (IN); Sachin Premsukh Lodha, Pune (IN)

(73) Assignee: Tata Consultancy Limited Services, Mumbai (IN)

( * ) Notice: Subject to any disclaimer, the term of this patent is extended or adjusted under 35 U.S.C. 154(b) by 318 days.

(21) Appl. No.: 17/452,186

(22) Filed: Oct. 25, 2021

(65) Prior Publication Data
US 2022/0131890 A1    Apr. 28, 2022

(30) Foreign Application Priority Data

Oct. 26, 2020 (IN) ............................. 202021046660

(51) Int. Cl.
*H04L 9/40* (2022.01)
*H04L 41/142* (2022.01)

(52) U.S. Cl.
CPC ........ *H04L 63/1433* (2013.01); *H04L 41/142* (2013.01); *H04L 63/102* (2013.01); *H04L 63/1416* (2013.01)

(58) Field of Classification Search
CPC ... G06F 21/552; G06F 21/577; H04L 41/142; H04L 63/102; H04L 63/1416; H04L 63/1425; H04L 63/1433
See application file for complete search history.

(56) References Cited

U.S. PATENT DOCUMENTS 11,190,534 B1 *  11/2021  Shah ................... H04L 63/1425
11,715,053 B1 *  8/2023   Qazvinian .......... G06Q 10/0635
                                                   705/7.28
(Continued)

FOREIGN PATENT DOCUMENTS

| CN | 108063776 A | 5/2018 |
|----|-------------|--------|
| CN | 112632564 A | 4/2021 |
| WO | WO2016073379 A2 | 5/2016 |

OTHER PUBLICATIONS

Shan, Chun et al., "An Approach for Internal Network Security Metric Based on Attack Probability", Security Measurements of Cyber Networks, Apr. 2018, vol. 2018, Hindawi, https:/downloads.hindawi.com/journals/scn/2018/3652170.pdf.

(Continued)

*Primary Examiner* — Gil H. Lee
(74) *Attorney, Agent, or Firm* — Finnegan, Henderson, Farabow, Garrett & Dunner, L.L.P.

(57) ABSTRACT

This disclosure relates generally to system and method for assessing insider influence on enterprise assets. Existing work focuses on the detection of insider threat and does not consider the influence of an insider on their peers and subordinates. The present disclosure aggregates and preprocesses the enterprise data specific to the individuals received from various sources, and further creates an enterprise graph between entities. Weights of every edge connected between any two entities in the enterprise graph is then calculated. Community of the individuals are detected wherein, relevant insider(s) are identified, and susceptibility of the individuals for probable influence by relevant insider(s) based on the analysis scenarios(s) is calculated. Paths taken by the relevant insider(s) is calculated for estimating probability of data loss. The present disclosure identifies the assets which are under possible threat from the relevant insider(s), obtains (Continued)

cumulative risk associated with the enterprise and generates an analysis report accordingly.

15 Claims, 12 Drawing Sheets

(56) References Cited

U.S. PATENT DOCUMENTS

| | | | | |
|---|---|---|---|---|
| 2018/0084001 | A1* | 3/2018 | Hudis | H04L 63/1408 |
| 2020/0050605 | A1* | 2/2020 | Tung | G06F 16/9024 |
| 2021/0081539 | A1* | 3/2021 | Karin | G06F 21/577 |
| 2021/0084063 | A1 | 3/2021 | Triantafillos et al. | |

OTHER PUBLICATIONS

Price, Bob et al., "Proactive Insider Threat Detection through Graph Learning and Psychological Context", Computer Science, 2012, vol. 1, pp. 142-149, IEEE, https://www.computer.org/csdl/pds/api/csdl/proceedings/download-article/12OmNzwZ6oW/pdf.

Eberle, PhD, William, et al., "Insider Threat Detection Using a Graph-Based Approach", Cybersecurity Applications & Technology Conference for Homeland Security, Mar. 2009, Publisher: IEEE, http://sites.intech.edu/weberle/wp-content/uploads/sites/87/2018/06/JASR_2011.pdf.

Gamachchi, Anagi et al., "A Graph Based Framework for Malicious Insider Threat Detection", Insider Threat and Network Analysis, Sep. 2018, Research Gate, https:/scholarspace.manoa.hawaii.edu/bitstream/10125/41475/paper0326.pdf.

Senator, Ted E. et al., "Detecting insider threats in a real corporate database of computer usage activity", ACM SIGKDD international conference on Knowledge discovery and data mining, Aug. 2013, pp. 1393-1401, ACM, https://www.researchgate.net/publication/258048039_Detecting_insider_threats_in_a_real_corporate_data_base_of_computer_usage_activity/link/5a5551df0f7e9bf2a5350de2/download.

Saxena, Neetesh et al., "Impact and Key Challenges of Insider Threats on Organizations and Critical Businesses", Electronics, Sep. 2020, vol. 9 (9), MDPI, https://www.mdpi.com/2079-9292/9/9/1460.

Seo, Sang et al., "Study on Inside Threats Based on Analytic Hierarchy Process", Symmetry, Jul. 2020, vol. 12 (8), MDPI, https:/www.mdpi.com/2073-8994/12/8/1255.

Moriano, Pablo et al., "Insider Threat Event Detection in User-System Interactions", International Workshop on Managing Insider Security Threats, Oct. 2017, pp. 1-12, ACM, https://www.researchgate.net/publication/320740578_Insider_Threat_Event_Detection_in_User-System_ Interactions/link/59f8d7240f7e9b553ec0c33d/download.

* cited by examiner

SYSTEM AND METHOD FOR ASSESSING INSIDER INFLUENCE ON ENTERPRISE ASSETS

PRIORITY CLAIM

This U.S. patent application claims priority under 35 U.S.C. § 119 to: India Application No. 202021046660, filed on Oct. 26, 2020. The entire contents of the aforementioned application are incorporated herein by reference.

TECHNICAL FIELD

This disclosure relates generally to cybersecurity analytics, and more particularly to system and method for assessing insider influence on enterprise assets.

BACKGROUND

Insider threat is defined as the negative effect on an enterprise due to an individual who has or had access to the enterprise assets and internal working. The insider threat is risk to the confidentiality, integrity and availability of critical information assets and loss of reputation from the enterprise perspective. Based on an individual's intention, the existing literature on insider threat identifies two main classes of threat actors. The major class consists of individuals with no malicious intention and who performs anomalous action or divulge information unknowingly. However, the other class consists of individuals with malicious intent to harm the enterprise by stealing or sabotaging its assets.

Despite of the amount of research in this field, insider threat is still a problem field in cybersecurity which is mainly due to the presence of multiple dynamic and inter-dependent contexts related to data sharing. For example, casual data exchange between employees due to their reporting hierarchy or interpersonal relationship. In an enterprise setup, an influential individual may either force or persuade peers and subordinates to share privileged information. Further, this information sharing tends to appear normal to the existing solutions as it happens within a team (community), wherein regular exchange of information is common. Even if the insider is identified and corrective actions are taken, there is still a large and unknown attack surface open in the form of individuals who might have already been influenced. Thus, it is important to assess the reachability or influence of an insider on other benign users, and thereby, insider's indirect access to different assets within the enterprise.

Some of the existing works compute multiple attributes for everyone within the enterprise and then isolate the most anomalous behavior. Further, these works have used deviation from peer's as well as from individual's normal behavior for validating the individual's current behavior. More recently, one of the existing works uses a heuristic which converts log entries into a heterogenous graph by using the sequential and the logical relationships among the events. Each log entry is represented into a low-dimension vector by applying a graph embedding on the graph. Further, algorithm proposed in the above-mentioned existing work separates malicious and benign log entries into different clusters for detection. However, all the existing work focuses on the detection of insider threat.

SUMMARY

Embodiments of the present disclosure present technological improvements as solutions to one or more of the above-mentioned technical problems recognized by the inventors in conventional systems. For example, in one embodiment, a method for assessing insider influence on enterprise assets is provided. The method includes receiving, via one or more hardware processors, an enterprise data specific to one or more individuals associated with an enterprise from a plurality of sources, wherein the one or more individuals comprises of at least one of one or more vendors, one or more employees and one or more contractors associated with the enterprise; pre-processing, via the one or more hardware processors, the received enterprise data to obtain an intermediate common input representation; creating, via the one or more hardware processors, an enterprise graph between one or more entities from the obtained intermediate common input representation, wherein the one or more entities includes the one or more individuals and one or more assets associated with the enterprise, and wherein the enterprise graph includes a plurality of vertices consisting of the one or more entities associated with the enterprise in a present time period and a past time period, and a plurality of edges between the one or more entities and a plurality of attributes associated with the plurality of vertices and the plurality of edges; calculating, via the one or more hardware processors, a weight for each of the plurality of edges between any two connected entities based on a plurality of enterprise graph features and the plurality of attributes; detecting, via the one or more hardware processors, one or more communities of the one or more individuals by using a plurality of graph-based techniques based on the calculated weights of the plurality of edges; calculating, via the one or more hardware processors, a threshold behavior for the one or more individuals and the one or more detected communities within an observation window by applying a plurality of statistical methods based on the plurality of enterprise graph features and the plurality of attributes; performing, via the one or more hardware processors, a comparison of the threshold behavior of the one or more individuals calculated within the observation window with a current behavior of the one or more individuals to identify one or more potential insiders; performing, via the one or more hardware processors, a comparison of the current behavior of the one or more potential insiders and the current behavior of a plurality of individuals of the one or more detected communities to identify the one or more potential insiders as one or more relevant insiders; calculating, via the one or more hardware processors, a susceptibility of the plurality of individuals for probable influence by the one or more relevant insiders based on an analysis of a plurality of scenarios, wherein the plurality of scenarios includes hierarchy exploitation, relationship exploitation and mixed mode; calculating, via the one or more hardware processors, a plurality of paths taken by the one or more relevant insiders based on the calculated susceptibility of the plurality of individuals; and performing, via the one or more hardware processors, an analysis of the calculated paths to obtain a probability score indicative of a probable data loss.

In another aspect, there is provided a system for assessing insider influence on enterprise assets is provided. The system comprises: a memory storing instructions; one or more communication interfaces; and one or more hardware processors coupled to the memory via the one or more communication interfaces, wherein the one or more hardware processors are configured by the instructions to: receive, via one or more hardware processors, an enterprise data specific to one or more individuals associated with an enterprise from a plurality of sources, wherein the one or more individuals comprises of at least one of one or more vendors, one or more employees and one or more contractors associated with the enterprise. The system further comprises pre-processing, via the one or more hardware processors, the received enterprise data to obtain an intermediate common input representation; create, via the one or more hardware processors, an enterprise graph between one or more entities from the obtained intermediate common input representation, wherein the one or more entities includes the one or more individuals and one or more assets associated with the enterprise, and wherein the enterprise graph includes a plurality of vertices consisting of the one or more entities associated with the enterprise in a present time period and a past time period, and a plurality of edges between the one or more entities and a plurality of attributes associated with the plurality of vertices and the plurality of edges; calculate, via the one or more hardware processors, a weight for each of the plurality of edges between any two connected entities based on a plurality of enterprise graph features and the plurality of attributes; detect, via the one or more hardware processors, one or more communities of the one or more individuals by using a plurality of graph-based techniques based on the calculated weights of the plurality of edges; calculate, via the one or more hardware processors, a threshold behavior for the one or more individuals and the one or more detected communities within an observation window by applying a plurality of statistical methods based on the plurality of enterprise graph features and the plurality of attributes; perform, via the one or more hardware processors, a comparison of the threshold behavior of the one or more individuals calculated within the observation window with a current behavior of the one or more individuals to identify one or more potential insiders; perform, via the one or more hardware processors, a comparison of the current behavior of the one or more potential insiders and the current behavior of a plurality of individuals of the one or more detected communities to identify the one or more potential insiders as one or more relevant insiders; calculate, via the one or more hardware processors, a susceptibility of the plurality of individuals for probable influence by the one or more relevant insiders based on an analysis of a plurality of scenarios, wherein the plurality of scenarios includes hierarchy exploitation, relationship exploitation and mixed mode; calculate, via the one or more hardware processors, a plurality of paths taken by the one or more relevant insiders based on the calculated susceptibility of the plurality of individuals; and perform, via the one or more hardware processors, an analysis of the calculated paths to obtain a probability score indicative of a probable data loss.

In yet another aspect, there are provided one or more non-transitory machine-readable information storage mediums comprising one or more instructions which when executed by one or more hardware processors cause receiving, via one or more hardware processors, an enterprise data specific to one or more individuals associated with an enterprise from a plurality of sources, wherein the one or more individuals comprises of at least one of one or more vendors, one or more employees and one or more contractors associated with the enterprise; pre-processing, via the one or more hardware processors, the received enterprise data to obtain an intermediate common input representation; creating, via the one or more hardware processors, an enterprise graph between one or more entities from the obtained intermediate common input representation, wherein the one or more entities includes the one or more individuals and one or more assets associated with the enterprise, and wherein the enterprise graph includes a plurality of vertices consisting of the one or more entities associated with the enterprise in a present time period and a past time period, and a plurality of edges between the one or more entities and a plurality of attributes associated with the plurality of vertices and the plurality of edges; calculating, via the one or more hardware processors, a weight for each of the plurality of edges between any two connected entities based on a plurality of enterprise graph features and the plurality of attributes; detecting, via the one or more hardware processors, one or more communities of the one or more individuals by using a plurality of graph-based techniques based on the calculated weights of the plurality of edges; calculating, via the one or more hardware processors, a threshold behavior for the one or more individuals and the one or more detected communities within an observation window by applying a plurality of statistical methods based on the plurality of enterprise graph features and the plurality of attributes; performing, via the one or more hardware processors, a comparison of the threshold behavior of the one or more individuals calculated within the observation window with a current behavior of the one or more individuals to identify one or more potential insiders; performing, via the one or more hardware processors, a comparison of the current behavior of the one or more potential insiders and the current behavior of a plurality of individuals of the one or more detected communities to identify the one or more potential insiders as one or more relevant insiders; calculating, via the one or more hardware processors, a susceptibility of the plurality of individuals for probable influence by the one or more relevant insiders based on an analysis of a plurality of scenarios, wherein the plurality of scenarios includes hierarchy exploitation, relationship exploitation and mixed mode; calculating, via the one or more hardware processors, a plurality of paths taken by the one or more relevant insiders based on the calculated susceptibility of the plurality of individuals; and performing, via the one or more hardware processors, an analysis of the calculated paths to obtain a probability score indicative of a probable data loss.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

4C) on multiple dimensions, according to some embodiments of the present disclosure.

Figure 5A:
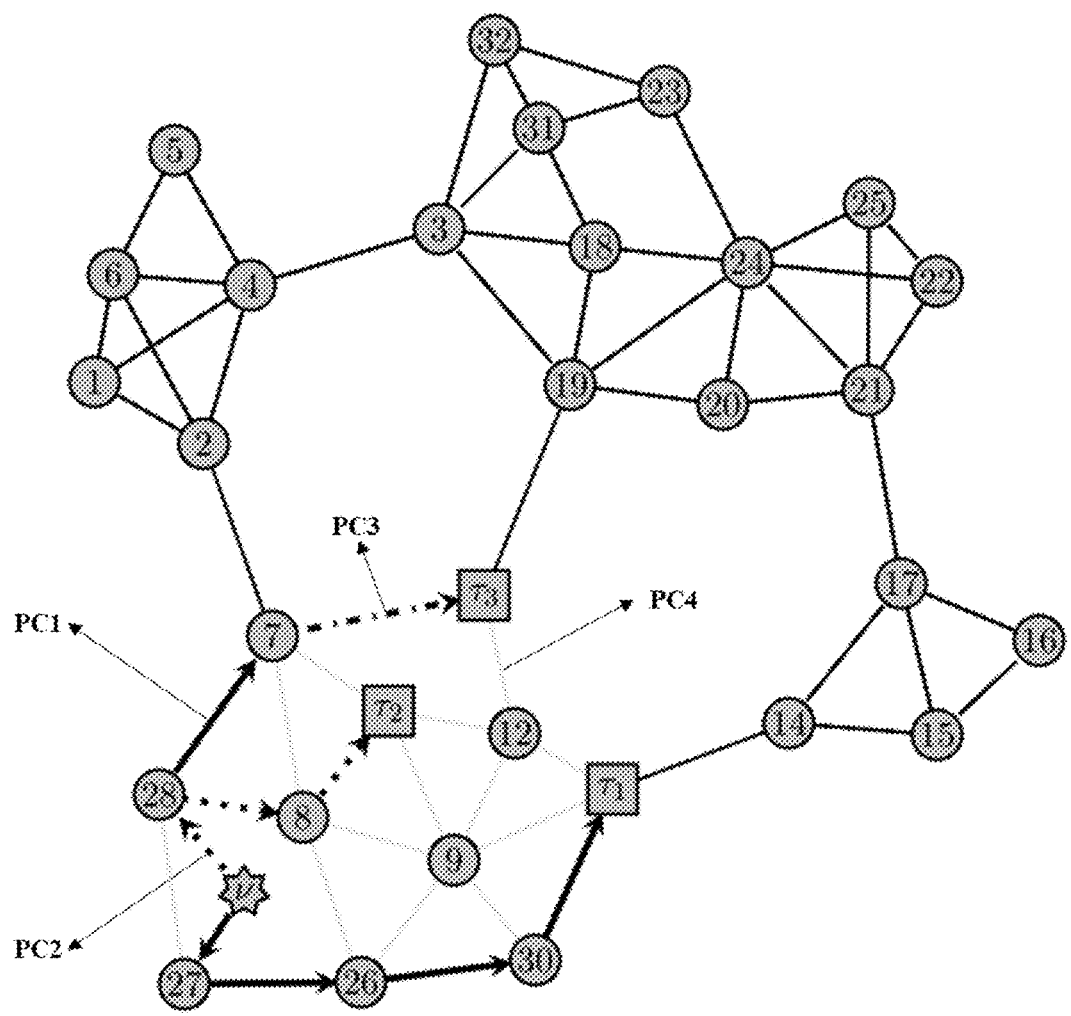
Figure 5B:
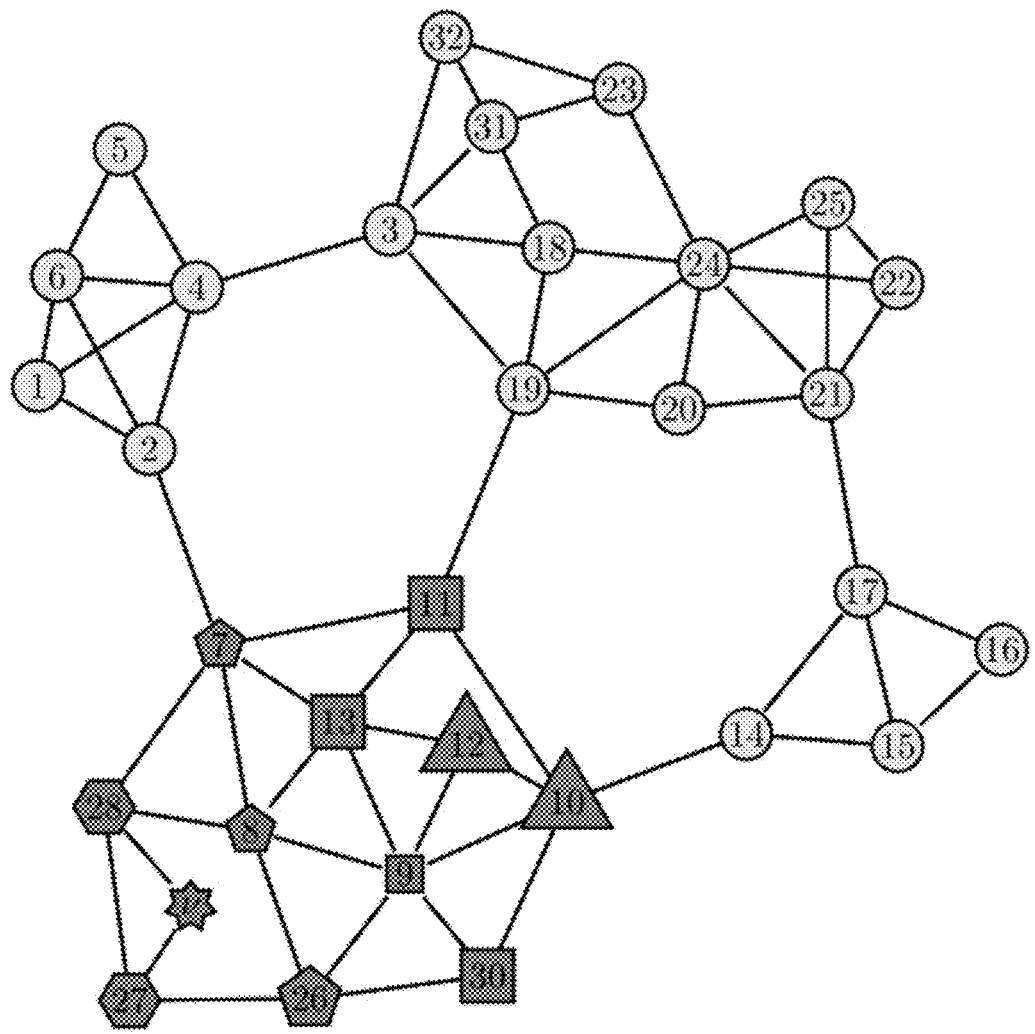

FIGS. 5A and 5B are the use cases illustrating a communication graph of a plurality of communities, according to some embodiments of the present disclosure.

Figure 6:
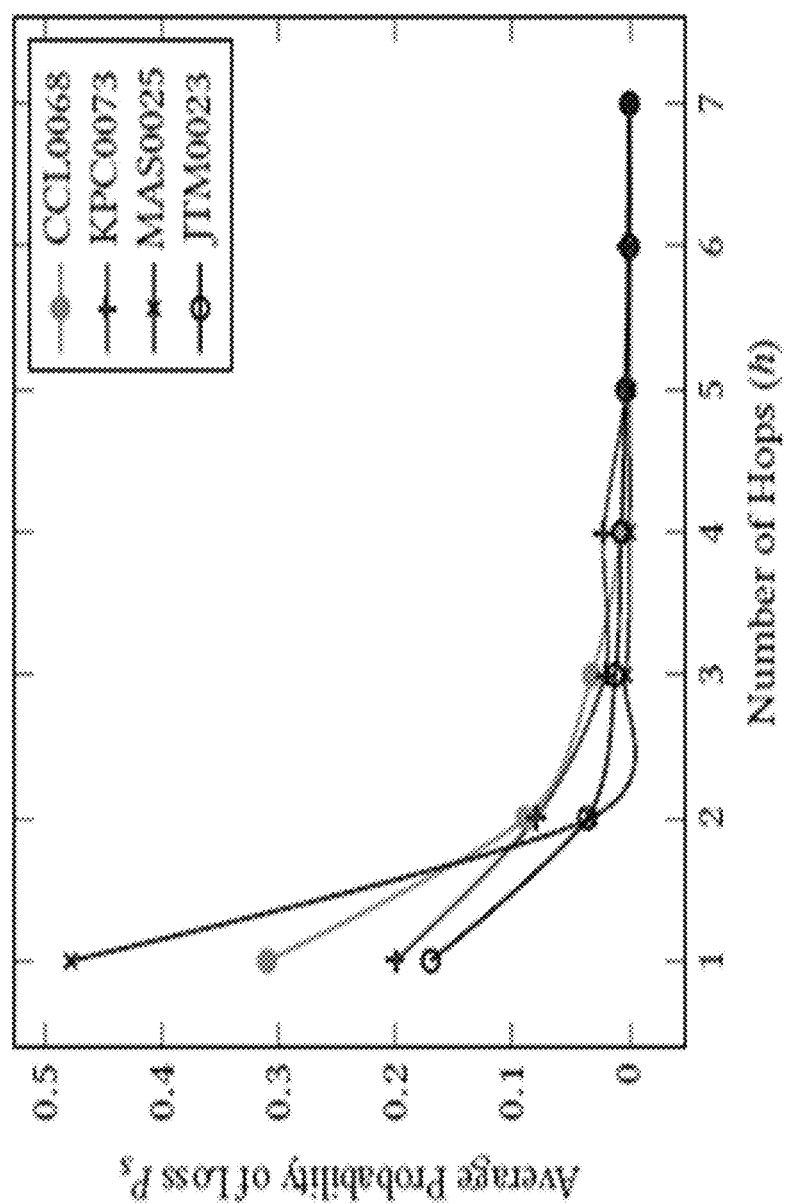

FIG. 6 illustrates an average probability of loss with respect to a number of hops for four suspects in the CMU CERT (Carnegie Mellon University, Computer Emergency Response Team) dataset, according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a system and method for assessing insider influence on enterprise assets. The present disclosure primarily focuses on assessing the influence of an insider on other benign users, and thereby, their indirect reachability to different assets within the enterprise. The present system first detects the community of the one or more individuals associated with the enterprise and then identifies the one or more individuals with suspicious behavior. For a given community (usually a project team), the present system calculates the susceptibility of the one or more individuals for probable influence by an identified insider as a function of their position in reporting hierarchy and the health of communication (indicating the strength of interpersonal relationship). Further, the results from the spread and influence detection are used to identify the assets which are under possible threat from the one or more individuals with suspicious behavior. Further, the present disclosure provides a method to calculate the probability of information loss which in turn helps in calculating the risk profiles. More specifically, the present disclosure enables the detection of the insider's influence over other individuals in his/her team.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

Figure 1:
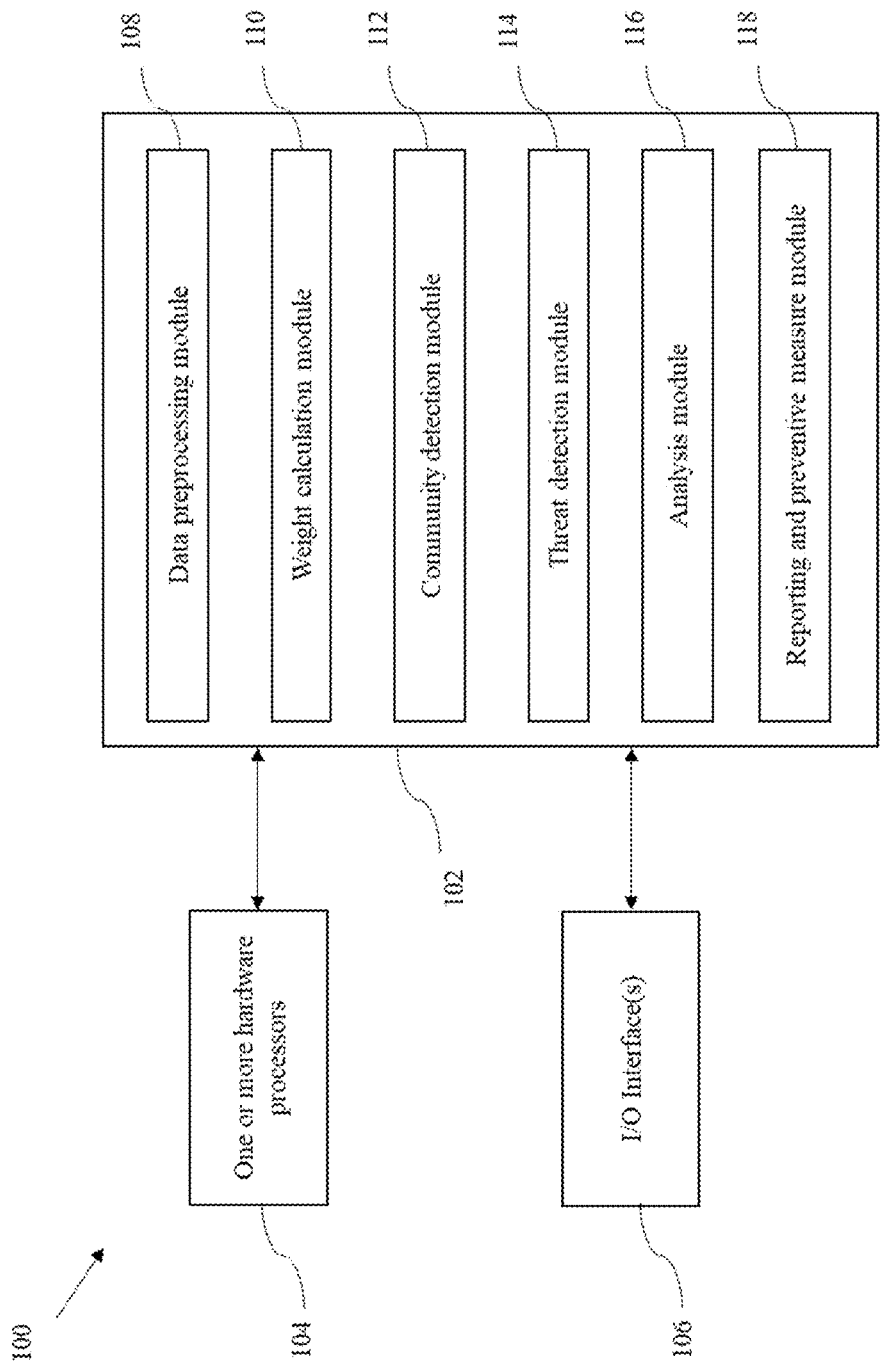
FIG. 1 illustrates an exemplary system for assessing insider influence on enterprise assets, according to some embodiments of the present disclosure.

FIG. 1 illustrates an exemplary system (100) for assessing insider influence on enterprise assets, according to some embodiments of the present disclosure. In an embodiment, the system 100 includes one or more processors 104, communication interface device(s) or input/output (I/O) interface(s) 106, one or more data storage devices or memory 102 operatively coupled to the one or more processors 104. In an embodiment, the system 100 further includes a data preprocessing module 108, a weight calculation module 110, a community detection module 112, a threat detection module 114, an analysis module 116 and a reporting and preventive measure module 118. The one or more processors 104 are hardware processors and can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 200 by the one or more processors 104.

Figure 2A:
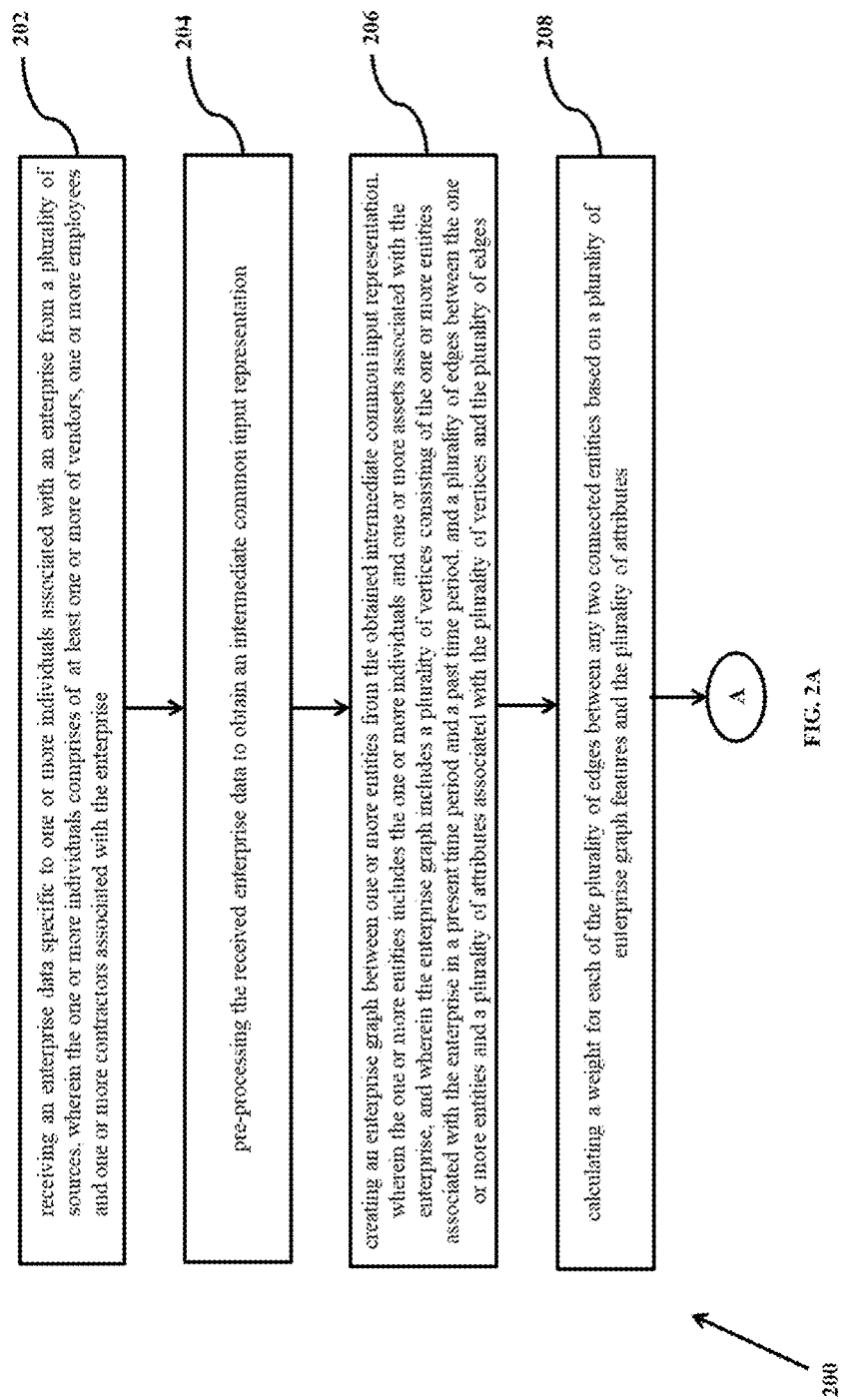
FIGS. 2A through 2C illustrate a flow diagram for the steps involved in the method for assessing insider influence on enterprise assets, according to some embodiments of the present disclosure.
Figure 2B:
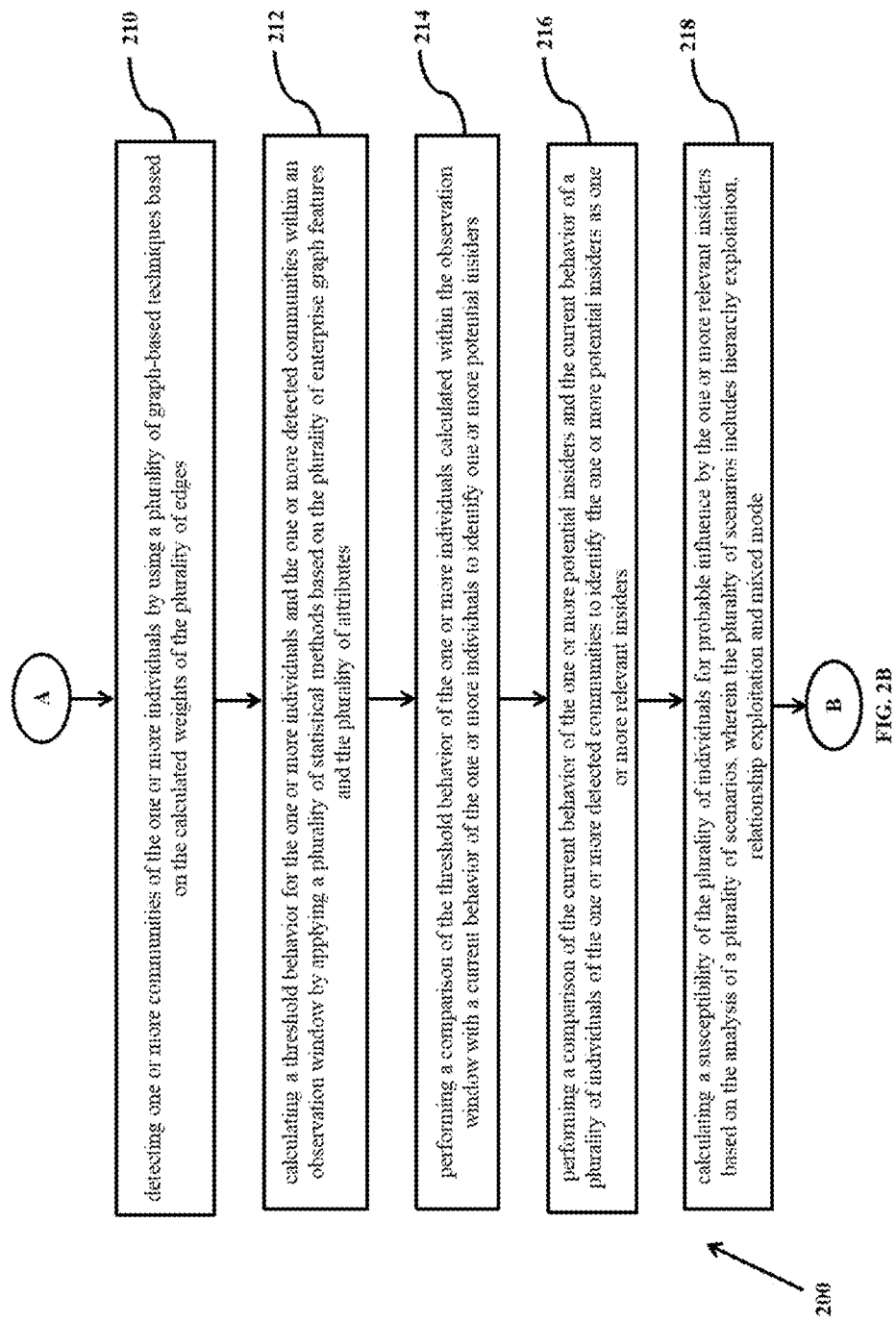
Figure 2C:
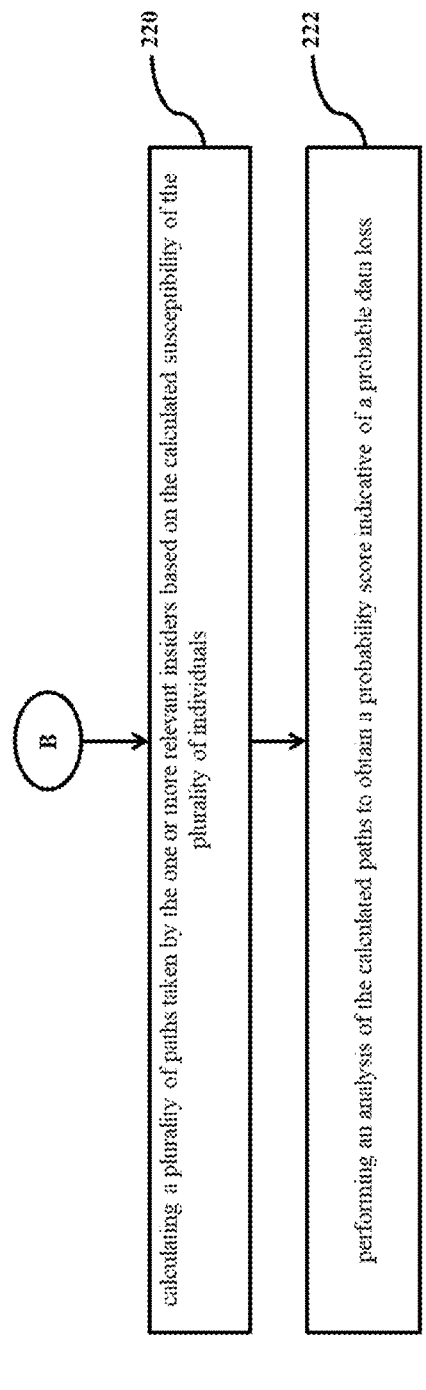

FIGS. 2A through 2C illustrate a flow diagram for the steps involved in the method for assessing insider influence on enterprise assets, according to some embodiments of the present disclosure. Steps of the method of FIG. 2A through 2C shall be described in conjunction with the components of FIG. 1. At step 202 of the method 200, the one or more hardware processors 104, receive an enterprise data specific to one or more individuals associated with an enterprise from a plurality of sources, wherein the one or more individuals comprises of at least one of one or more vendors, one or more employees and one or more contractors associated with the enterprise. The enterprise data specific to the one or more individuals associated with the enterprise may include login-logout time, device usage events, I/O (Input/Output) events, punch in/punch out time (entry inside office), network events, email(s) and the like. The plurality of sources can be anything including network logs, SIEM/SYSLOG events (captures device, I/O, registry, process evets), DBLP (Digital Bibliography and Library Project) co-author, social network data, office swipe in/out data, email(s) and the like. At step 204 of the method 200, the one or more hardware processors 104 pre-process the received enterprise data to obtain an intermediate common input representation. Some of the examples of rule-based algorithms with respect to the present disclosure includes, ignoring a plurality of edges between the two or more individual pairs if the communication is less than global average, flagging the one or more individual's activity as abnormal if the pluggable device usage is more than the community average and if the login time of the one or more individuals is beyond usual time. Heuristics are simple strategies for making decisions for complex problem, wherein some of the examples with respect to the present disclosure includes, marking an activity as suspicious, if the one or more individuals opens a file which is received from a client email id, and then copies to a different file type and encrypt it. Further an activity is marked as suspicious, if the one or more individuals copy a large amount of data in short bursts of time to a removable drive. Referring to the FIG. 1, the data preprocessing module 108 of the system 100 aggregates the data from the plurality of sources, perform necessary pre-processing and feature transformation to obtain an intermediate common input representation for a machine learning/rule based/heuristic algorithm. As an event/activity from each source is different, for example, for I/O event it could be file id (also referred as file identifier), name, parent name, size, date etc. which are in different format and also the HTTP (hypertext transfer protocol) logs includes fields which are in different format. The enterprise data which are in different format are then converted to CSV (comma separated values) format with addition of additional attributes which includes event id and the user responsible for that event. The final common input representation fields include universal id, time stamp, event name, entity name, user, data (additional data specific to data source). The data preprocessing module 108 further includes a pre-processing engine which performs the feature engineering and feature transformation of the input samples/data specific to the one or more individuals in the enterprise based on the pre-configuration required by the machine learning algorithms. The feature engineering and feature transformation includes constructing or deducing new features from the existing enterprise data, for example, if daily login and logoff data is available for the one or more individuals on a given system, then the usual shift duration can be deduced, further the one or more individual's time to come to office and leave the office, holidays, weekends and abnormal logins could also be deduced. Further, the arrival of enterprise data can be a continuous-stream or a batch-wise input which helps in deciding an optimal algorithm for detection of the insider threat, detecting their existing community, identifying the different type of relationship between the one or more individuals, determining/identifying the optimal route (from malicious user to the targeted individual with most influenced individuals) for data exfiltration, and deciding one or more preventive steps. Further, the pre-processing engine considers the data rate and efficiency while processing the received enterprise data. The pre-processing involves cleaning of data (removal of outliers), de-duplication of events (for performance), merging of multiple accounts related to the one or more individuals (user with multiple roles or accounts or IDs), removal of spurious edges between the one or more individuals based on a plurality of statistical methods (like number of messages from one to another vertex should be greater than a threshold value). Here, a threshold value associated with enterprise graph helps in identifying the mutual relevance between the one or more individuals. For user u and v, there are two threshold values which are possible (depending on the direction for which relevance is calculated) wherein these two values are $$\frac{2}{d_u} \text{ and } \frac{2}{d_v}$$

where $d_u$ is the degree of node u and $d_v$ is degree of node v. The choice of numerator is based on Markov inequality. In an embodiment, "vertex" represents an individual associated with the enterprise.

At step 206 of the method 200, the one or more hardware processors 104 create an enterprise graph between one or more entities from the obtained intermediate common input representation, wherein the one or more entities includes the one or more individuals and one or more assets associated with the enterprise, and wherein the enterprise graph includes a plurality of vertices consisting of the one or more entities associated with the enterprise in a present time period and a past time period, and a plurality of edges between the one or more entities and a plurality of attributes associated with the plurality of vertices and the plurality of edges. The enterprise graph may be referred as graph and interchangeably used herein. In the present disclosure, the one or more entities includes the one or more individuals and one or more assets associated with the enterprise wherein the one or more assets can include virtual devices (for example: cloud) and/or physical devices (for example: hardware devices which includes servers, data storage devices, networking equipment and the like) associated with the enterprise. The present system 100 creates an enterprise graph G=(V, E, A), where V is a plurality of vertices consisting of the one or more entities associated with the enterprise in a present time period and a past time period, E is a plurality of edges between the one or more entities and A is a plurality of attributes associated with the plurality of vertices and the plurality of edges. The plurality of attributes can include attributes specific to the one or more assets (for example, asset id, server attributes, geolocation, IP address, CPU (Central Processing Unit) count, RAM (Random-Access), HDD (Hard disk drive), CPU (Central Processing Unit) usage and the like) and attributes specific the one or more individuals (for example, {role, experience, peers, team size, project}) associated with the enterprise. Further, the attributes specific to the plurality of edges can include weight, timestamp, direction, color and the like. At step 208 of the method 200, the one or more hardware processors 104 calculate a weight for each of the plurality of edges between any two connected entities based on a plurality of enterprise graph features and the plurality of attributes. Referring to FIG. 1, the weight calculation module 110 of the system 100 calculates the weight for each of the plurality of edges between any two connected entities based on multiple criteria, for example, following could be derived from the plurality of enterprise graph features including the weight as a ratio of mutual messages to global ratio, a mutual to local messages ratio, a relative importance-based ratio, a quantile-based scoring, whereas a temporal score is derived based on the recency of communication which is further based on the plurality of attributes specific to the plurality of edges. For example, if M is the total number of messages shared between any two given individuals (u, v) in set V then the edge weight $W_{u,v}$ is given as:

$$W_{u,v} = \begin{cases} 1/M_{u,v}, & \text{if } M_{u,v} > 0 \\ \infty, & \text{otherwise} \end{cases}$$

The above equation implies that frequently communicating candidates have lower edge weight.

Another method based on quantile can be described as follows for calculating weight $W_{u,v}$:

The present disclosure takes the number of sent messages from each directed edge and put it in a list $\Omega$ and sort the list in ascending order. Further, the present disclosure partitions $\Omega$ into q-quantiles. For vertices u and v, let P={$v_0$=u, $v_1, \ldots, v_n$=v} be the optimal path consisting of the plurality of edges, where $P \subset E$. Let $e_j$ be a directed edge between $(v_{j-1}, v_j) \in P$. Also based on the number of sent messages, let the edge $e_j$ belongs to the $k^{th}$ quantile of $\Omega$, then the weight $w_j$ of edge $e_j$ is calculated as: $w_j = k/q$, where $k=1, 2, \ldots, q$. Another method based on relative mutual importance for calculating weight $W_{u,v}$ can be calculated as:

For a given path, $S(v, \tau_1) = \{v_0 = u, v_1, \ldots, v_{h-1}, v_h = v\}$, let $C_{v_{j-1}}$ be the total communication on the edges incident on node $v_{j-1}$ and $C_{v_j}$ be the total communication on the edges incident on node $v_j$. For edge $(v_{j-1}, v_j) \in E$, let $C_{v_{j-1}, v_j}$ be the mutual communication. The weight $w_j$ can be calculated as:

$$w_j = \begin{cases} 1, & v_j \text{ reports to } v_{j-1} \\ C_{v_{j-1}, v_j} / C_{v_{j-1}}, & \text{otherwise} \end{cases}$$

The above three methods show the configurability of the system of the present disclosure, which allows it to have standard or custom edge weight calculation algorithms.

In an embodiment of the present disclosure, the thresholds are calculated by applying various statistical methods on the plurality of enterprise graph features and a plurality of graph properties wherein the plurality of graph properties can include average communication, degree of vertex, average degree of vertex, percentage distribution of messages in a community (subgraph) and the like. Further, the plurality of enterprise graph features are considered for both directed and undirected graphs. In the present disclosure, as far as the complete system is considered, there are multiple thresholds which are used, for example, degree of a vertex ($d_u$ and $d_v$), $\mu_f^w \pm \theta * \sigma_f^w$ for detection of a one or more relevant insiders, and further details on the same are discussed in later sections. In an embodiment of the present disclosure, the plurality of graph properties can be calculated using standard graph concepts/algorithms for example, degree of vertex and average degree of vertex, average communication (average edges for pair of vertices) and distribution of messages (that is distribution of edges in a subgraph).

At step 210 of the method 200, the one or more hardware processors 104 detect one or more communities of the one or more individuals by using a plurality of graph-based techniques based on the calculated weights of the plurality of edges. The community detection module 112 of the system 100 is configured to the detect one or more communities of the one or more individuals by using various graph-based techniques, their co-author network, social network relationship, content sharing behavior, reporting hierarchy, code-repository/version control system access pattern and the like.

In an example embodiment, the co-author network is explained with an example below.

For paper 'test.pdf' authors are A, B, D, E
For paper 'west.pdf' authors are C, D, E
For paper 'rest.pdf' authors are D, B, F
For paper 'pest.pdf' authors are B, E, F
Therefore, co-author graph is (here-means an edge between the author):
A-B
A-D
A-E
B-D
B-E
B-F
C-D
C-E
D-E
D-F
E-F As considered in the previous sections, let $G = (V, E, A)$ be the undirected communication graph of the enterprise, where V is plurality of vertices consisting of one or more entities associated with the enterprise, E is plurality of edges between the one or more entities in a present time period and a past time period and A be plurality of attributes associated with the plurality of vertices and the plurality of edges. A node i is part of the community $X \subset G$, if and only if:

$$\frac{k_i^{in}(X)}{k_i^{out}(X)} > K, \forall i \in X$$

where, $k_i^{in}(X)$ is number of edges connecting node i to the other vertex in X and $k_i^{out}(X)$ is the number of edges connecting i to the vertex which are not in X.

In the above equation, K is the cohesiveness of the community and can have values >0. when K=1, the Equation 1. For values greater than 1, it suggests a more frequent and dense communication between the one or more individuals within X. Further the present system could also utilize the enterprise specific information to further refine the community discovery, for example, using reporting hierarchy, content sharing behavior, access to code/version management repository to name few.

At step 212 of the method 200, the one or more hardware processors 104 calculate a threshold behavior for the one or more individuals and the one or more detected communities within an observation window by applying a plurality of statistical methods based on the plurality of enterprise graph features and the plurality of attributes. At step 214 of the method 200, the one or more hardware processors 104 perform a comparison of the threshold behavior of the one or more individuals calculated within the observation window with a current behavior of the one or more individuals to identify one or more potential insiders. At step 216 of the method 200, the one or more hardware processors 104 perform a comparison of the current behavior of the one or more potential insiders and the current behavior of a plurality of individuals of the one or more detected communities to identify the one or more potential insiders as one or more relevant insiders. Referring to FIG. 1, the threat detection module 114 of the system uses various techniques, for example, a low pass filter-based method which uses an analysis/observation window of size 'W' to compare the one or more individual's current behavior with the past behavior (threshold behavior) calculated for that window. In case of potentially malicious behavior, the one or more individual is identified as the one or more potential insiders and the current behavior of the one or more potential insiders is compared with the current behavior of the peers of the one or more detected communities with same role within the same window 'W' to identify the one or more potential insiders as the one or more relevant insiders. Another method consists of utilization of isolation forest-based technique for identifying the one or more relevant insiders. One of the most recent technique uses graph encoding for training the deep learning model for detecting malicious behavior. In addition to that there are other heuristic and machine learning based method which can be utilized for detecting the malicious insider activity in the enterprise. For example, a low-pass filter based-based detection method is depicted in FIG. 3 and described below:

Behavior Flagging

A low pass filter can be used as an unsupervised statistical anomaly detection method for filtering out high frequency normal benign behavior. The low-pass filter can be implemented as a rolling mean which is a type of convolution, $$(f*g)(t) \triangleq \int_{-\infty}^{\infty} f(\tau)*g(t-\tau)d\tau$$

where, $f(\tau)$ is the input function and $g(\tau)$ is the weighting function shifted by time t. For discrete input, for example events happening occurring at distinct points in time, the convolution equation becomes:

$$\Sigma_{\tau=-\infty}^{\infty} f(\tau)*g(t-\tau)$$

Also, the input data has a normal distribution as the anomalous behaviors are rare in a large population, and therefore, most of the behaviors are clustered around the mean behavior. Let $\mu_f^w$ and $\sigma_f^w$ be the mean and the standard deviation for the analysis window w and selected feature f for a data source d. The one or more individual's behavior is defined as an anomalous for a feature f during analysis window w if it is not within the range $\mu_f^w \pm \theta*\sigma_f^w$, where $\theta$ is a configurable parameter.

Behavior Validation

A suspected behavior of the one or more individuals is first validated against the current community wherein this step normally helps in limiting the scenarios wherein there are some events triggered activities or the one or more individuals moves from one community to another, for example change of project. Due to rarity of anomalous behavior, the behavior of the one or more detected communities related to the one or more individuals is also assumed to be normally distributed, therefore the above analysis is also applicable on the community behavior analysis. An additional validation could be done by comparing the one or more potential insider's (v) behavior with the associated peers. Let $P_v=\{p_1, \ldots, p_k\}$ be the set of peers based on the one or more potential insider's role. All the peers in $P_v$ validate the behavior of v by comparing the behaviour against their own behavior during the time window 'W' for feature f in dataset d. Once the validation result is obtained from all the peers voting is done by considering the absolute majority, i.e., a number of votes, either against or in favor, should be greater than $|P_v|/2$.

Table 1 represents Peer voting for suspected behavior for a suspect in CMU CERT (Carnegie Mellon University, Computer Emergency Response Team) dataset.

Column 1 shows 1 standard deviation from the mean, whereas column 2 shows 2 standard deviations from the mean behavior.

| Dimensions | $\mu + \sigma$ | $\mu + 2 * \sigma$ |
| --- | --- | --- |
| Device Session Frequency (D1) | 94.8% | 55.7% |
| External Emails (D2) | 23.7% | 4.1% |
| File Copy Session (D3) | 33.3% | 11.1% |
| All Emails (D4) | 94.8% | 3.1% |
| Logon Session (D5) | 55.5% | 22.2% |

It is to be noted that above method is an example of possible insider detection method and there could be potentially a plurality of other methods based on machine learning, deep learning, graph analysis, heuristic and rule based. The present disclosure allows the state-of-the-art or custom method to be used for detection purpose.

At step 218 of the method 200, the one or more hardware processors 104 calculate a susceptibility of the plurality of individuals for probable influence by the one or more relevant insiders based on the analysis of a plurality of scenarios, wherein the plurality of scenarios includes hierarchy exploitation, relationship exploitation and mixed mode. More specifically, the susceptibility is calculated to determine by how much is an individual is being influenced by the one or more relevant insiders. Referring to FIG. 1, the analysis module 116 of the system 100 is the core of the present disclosure which uses 3 predominant scenarios for calculating the various results. More specifically, the present disclosure explores the following three scenarios which can be exploited by the insider) to achieve his/her goal of data exfiltration:

Scenario 1. Hierarchy Exploitation. It is common in the enterprise that the one or more individuals shares the information requested by their supervisor. The one or more insiders in the supervisor position could exploit this directly if there exist a sequence $S(v, \tau_1)=\{v_0=v, v_1, \ldots, v_{h-1}, v_h=\tau_1\}$, such that, individual $v_i$ reports to $v_{i-1}$, $\forall v_i \in X$.

Wherein, $S(v, \tau_1)=\{v_0=v, v_1, \ldots, v_{h-1}, v_h=\tau_1\}$, represents a path between v and $\tau_1$ with intermediate vertex $v_1 \ldots v_{h-1}$. Since this is hierarchy exploitation therefore, every preceding vertex is the supervisor of the next vertex in sequence.

Scenario 2. Relationship Exploitation. The optimal path in this scenario consists of edges with a good message density which is explained in detail in further sections. An insider would try to exploit this interpersonal relationship between the vertex to get the desired information.

Scenario 3. Mixed Mode. This scenario consists of a combination of previous two scenarios. In this the one or more relevant insiders tries to maximize their influence over the target by first exploiting the reporting hierarchy, and then selecting paths with healthy communication edges. The 3 scenarios mentioned above helps in understanding the susceptibility of a node for leaking data under the influence of the one or more relevant insiders. It is to be understood by a person having ordinary skill in the art or a person skilled in the art that the above scenarios shall not be construed as limiting the scope of the present disclosure, and the system and method described herein may utilize any other scenario as applicable basis requirement.

At step 220 of the method 200, the one or more hardware processors 104 calculate a plurality of paths taken by the one or more relevant insiders based on the calculated susceptibility of the plurality of individuals. For suspect (for example, one or more potential insiders) v and target (for example, victim) $\tau_1$ in subgraph X, let $S(v, \tau_1)=\{s_1, \ldots, s_t\}$ the set of all possible paths. The plurality of edges in community is further qualified by using patterns (or any other depiction that characterizes various edges amongst the community) according to the vertices to which they are connected with and the quality of the communication between them. Based on communication, let $th_{u,v}$ and $th_{v,u}$ be the thresholds for assessing the interpersonal relationship between u and v. For a data request from u to v, the present disclosure uses one of the following four patterns for edge indication/representation: a) pattern code 1 or PC1 indicated by the solid black arrows for representing reporting relationship ($P_{u,v}=1$), b) pattern code 2 or PC2 indicated by the dotted arrows represents healthy communication among the one or more individuals, that is, ($P_{u,v}>th_{u,v}$) and ($P_{v,u}>th_{v,u}$), c) pattern code 3 or PC3 indicated by a dash-dotted arrow represents weak communication, that is, ($P_{u,v}>th_{u,v}$) or ($P_{v,u}>th_{v,u}$), but not both, and d) pattern code 4 or PC4 indicated by thin grey lines represents the acquaintance (represents weaker edge between two entities within a given community) as depicted in FIGS. 5A and 5B. The patterns are assigned to give preference to reporting hierarchy and then communication density.

It is further quantified by assigning a value from the set {HIGH, MEDIUM, LOW, NONE}. The one or more individuals who reports to the one or more relevant insiders may have HIGH susceptibility for data sharing. Similarly, the one or more individuals with good interpersonal relationship with the insider may have MEDIUM-LOW chances as there are no obligation(s) to share data except for their past relationship. Finally, the one or more individuals with rare or occasional communication with the insider may have LOW-NONE chances of data sharing.

At step 222 of the method 200, the one or more hardware processors 104 perform an analysis of the calculated paths to obtain a probability score indicative of a probable data loss. Referring to the algorithm 1 which is explained in the further section, for a given path, $S(v, \tau_1) = \{v_0 = v, v_1, \ldots, v_{h-1}, v_h = \tau_1\}$, let $C_{v_{j-1}}$ be the total communication on the edges incident on node $v_{j-1}$ and $C_{v_j}$ be the total communication on the edges incident on node $v_j$. For edge $(v_{j-1}, v_j) \in E$, let $C_{v_{j-1},v_j}$ be the mutual communication. The probability of data leakage $P_j$ can be as:

$$P_j = \begin{cases} 1, & v_j \text{ reports to } v_{j-1} \\ C_{v_{j-1},v_j} / C_{v_{j-1}}, & \text{otherwise} \end{cases}$$

This above equation is similar to the previous equation of weight calculation as $P_j \propto w_j$ or $P_j = \alpha * w_j$, where $\alpha$ is a constant and for a static network/graph its value is 1. However, α can take other values depending on the setup, for example, α could be a decaying function for representing decrease in loss probability with time t, if two individuals are not in contact for a long time. As data sharing for each of the plurality of edges is an independent event, then the cumulative probability of data exfiltration associated with a path '$S(v, \tau_1)$' is:

$$P = \prod_{j=1}^{h} P_j$$

From the insider's perspective, he/she applies this equation to all given paths to a given target to arrive at the optimal path with the maximum probability of data exfiltration.

The present disclosure formally defines the influence of a node on others as a reachability problem for an undirected graph $G=(V, E, A)$. It is the set of all ordered pairs $(x, y)$ of vertices in V for which there exists a sequence of vertices $s(x, y) = \{v_0 = x, v_1, \ldots, v_{h-1}, v_h = y\}$, such that the edge $(v_{i-1}, v_i) \in E$ for all $1 \leq i \leq h$. Here 'h' is the number of hops from vertex x to y. In a graph there could be multiple paths (sequence of vertices) from a given source (v) (for example, one or more potential insiders) and target $(\tau_1)$ (for example, victim). The present disclosure uses 'Depth First Search' (DFS) for finding all the paths between the source and the target. The choice of DFS (Depth First Search) is due to the fact that $|X| \ll |G|$ with an additional restriction imposed by the number of hops which v can take to reach t, thus resulting in very fast path enumeration. From the one or more relevant insider's perspective, an optimal path is that which has the highest probability of getting the desired information from the target, as implemented in Algorithm 1 as depicted below:

---

Algorithm 1: Path analysis and Probability of data leakage

---

1: procedure PATHANALYSIS(S) S is the set of all paths between node u and v
2:    opt = nil Optimal path for data exfiltration
3:    for s ∈ S do
4:      limit = s. length( ) − 1, p = 1
5:      for idx = 0; idx ≤ limit; idx + 1 do
6:        u = s[idx], v = s[idx + 1], e = edge(u, v)
7:        $\text{probability} = \frac{C_{(u,v)}}{C_u}$
8:        if (e. color == 'red') and (v reports to u) then
9:          probability = 1 Direct request from supervisor
10:       end if
11:       p = p * probability
12:      end for
13:      s. probability = p
14:      if (opt = = nil) or (opt. probability < s. probability) then
15:        opt = s
16:      end if
17:    end for
18:    return opt Path with maximum probability of data leakage
19: end procedure

---

Let $I = \{I_1, \ldots, I_n\}$ be the set of individuals who are influenceable via direct or indirect communication with the insider. Further let $D_i = \{D_1, \ldots, D_k\}$ be the assets accessible by the $i^{th}$ individual $I_i \in I$, then the spread of the insider is defined as:

$$\text{Spread} = \bigcup_{i=1}^{n} D_i$$

In an embodiment of the present disclosure, a subset of the assets are the assets which are indirectly reachable by the one or more relevant insiders through their influence over their peers in the one or more detected communities. The subset of the assets may be referred as impacting assets and interchangeably used herein. Further, the impacting assets are the virtual or physical devices from where potential data loss is possible due to the one or more relevant insider's influence over the owners of such assets. The present disclosure performs risk profiling of the one or more individuals with the suspected behavior which helps the enterprise in identifying any potential threat. Further, the potential threat may negatively impact the enterprise assets, its reputation and the other individuals associated with the enterprise. Further the risk profiling helps the enterprise in making an informed decision about the risk and taking precautionary steps to avert any potential threat by the one or more relevant insiders. In present disclosure, first the one or more individuals with suspected behavior is identified followed by identification of his/her/their influence over other individuals in his/her/their community, and finally, his/her overall impact on the enterprise due to direct and indirect access to the assets of the enterprise is identified. The present disclosure calculates the total risk as the sum over the one or more individuals risks as suggested by Open web application Security Project (OWASP) standard. Let $R_i$ be the risk associated with the $i^{th}$ device, $L_i$ be the associated loss and $P_i$ be the probability of the loss, then:

$$R_i = L_i * P_i$$

And the cumulative risk R is given as:

$$R = \Sigma R_i$$

In the above Equation, $L_i$ can be evaluated with respect to the legal penalties to be paid by the enterprise, a monetary value associated with the loss or a less granular symbolic scaling like, extreme, high, moderate and low. $P_i$ is calculated as discussed in the above section.

In an embodiment of the present disclosure, the reporting and preventive measure module 118 of the system 100 is used for sharing the analysis report with various stakeholders. The reporting and preventive measure module 118 uses graph-based visualization of reporting hierarchy, interpersonal relationship, and various other properties (for example, message density, degree distribution, in/out degree and the like). The analysis and calculations discussed in the previous sections includes following:
1. Individuals
   a. Susceptibility score, that is, {HIGH, MEDIUM, LOW, NONE} as in one of the earlier sections.
   b. Reachability score from a given insider as discussed in one of the earlier sections.
2. Device
   a. Risk Score from a given insider
   b. Overall risk associated with all suspected individual (summation of the risk calculated in the above point)

Based on the above-mentioned scores, the reporting and preventive measure module 118 suggests multiple preventive and corrective measure, which includes reeducating susceptible individuals about good/recommended data sharing practices, installation licensed data leakage prevention solutions, active monitoring to name few. Such examples of preventive and corrective measures shall not be construed as limiting the scope of the present disclosure.

Figure 3A:
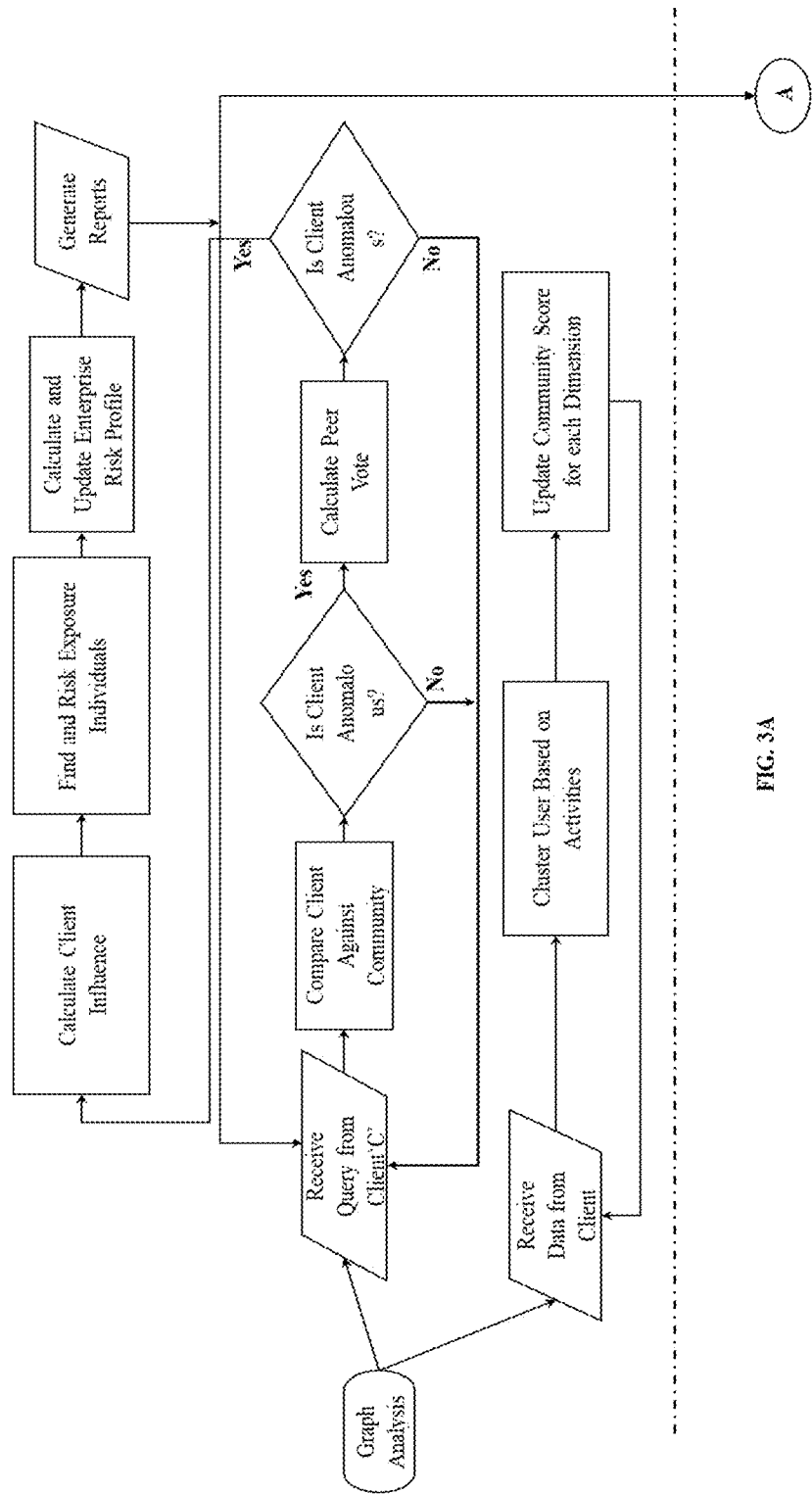
FIGS. 3A and 3B shows an example of insider detection technique illustrating a lowpass filter-based anomaly detection and community and peer voting for removing false positives, according to some embodiments of the present disclosure.
Figure 3B:
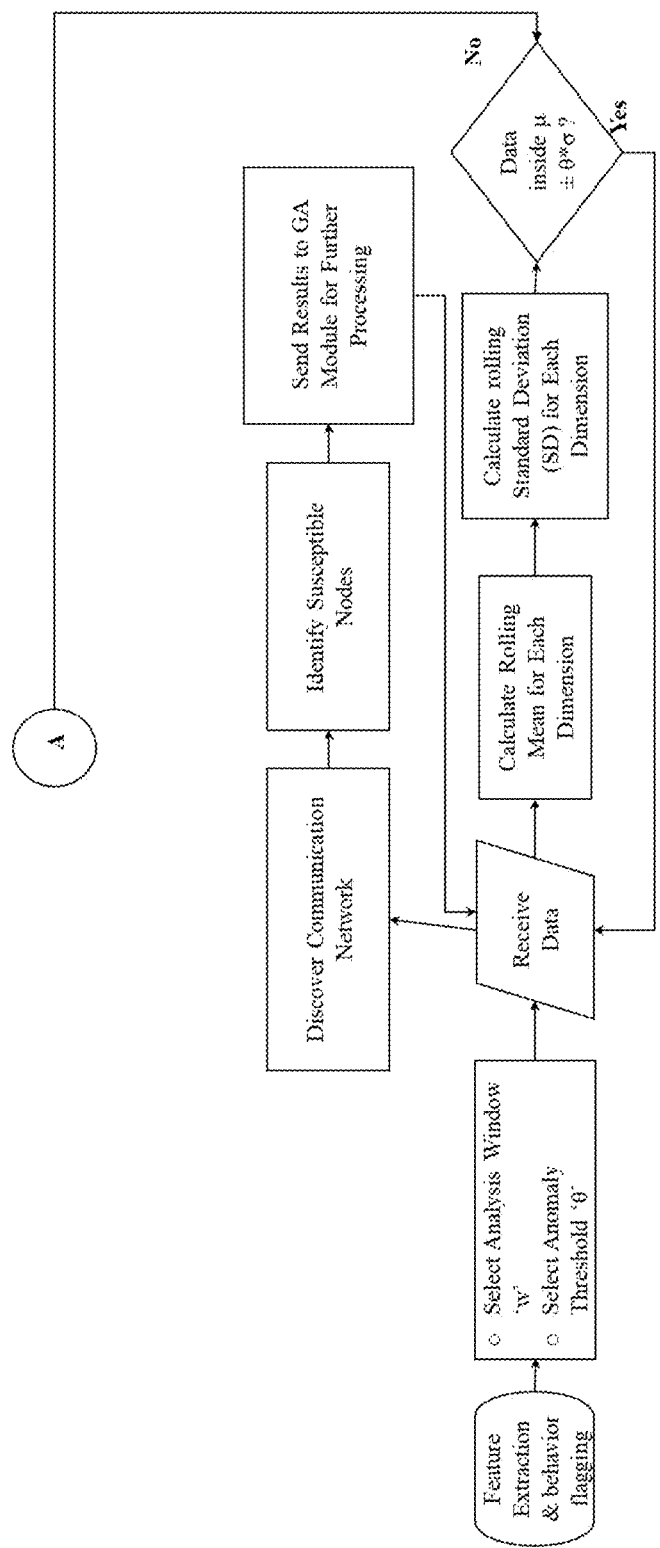

FIGS. 3A and 3B shows an example of insider detection technique illustrating a low-pass filter-based anomaly detection and community and peer voting for removing false positives, according to some embodiments of the present disclosure. The implementation details of the low-pass filter-based anomaly detection in conjunction with the present disclosure is explained in the earlier sections.

Figure 4A:
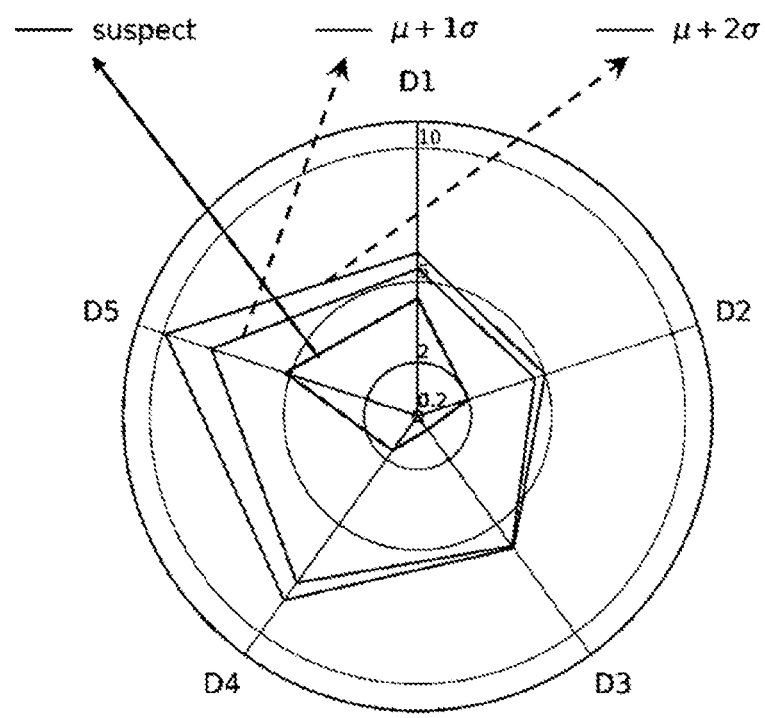
FIGS. 4A through 4C are the use cases illustrating the spider charts for the behavior of a normal individual (FIG. 4A), an anomalous behavior with respect to self (FIG. 4B) and suspect's behavior validation with community (FIG.
Figure 4B:
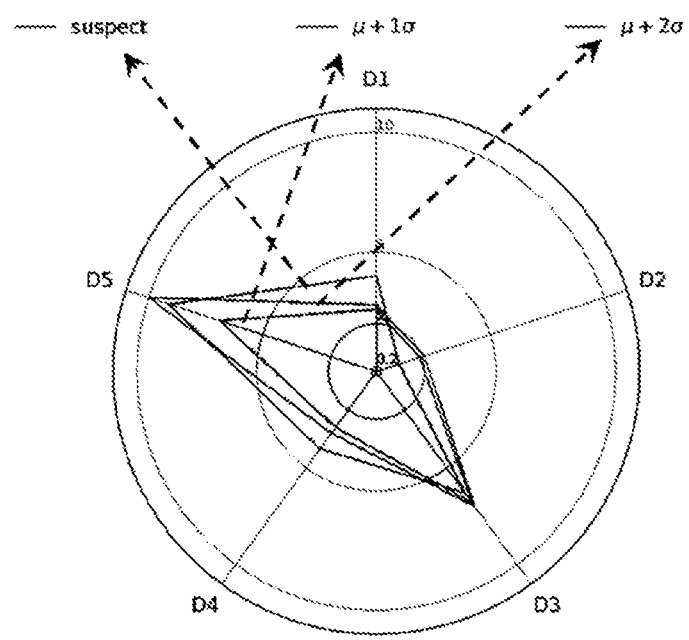
Figure 4C:
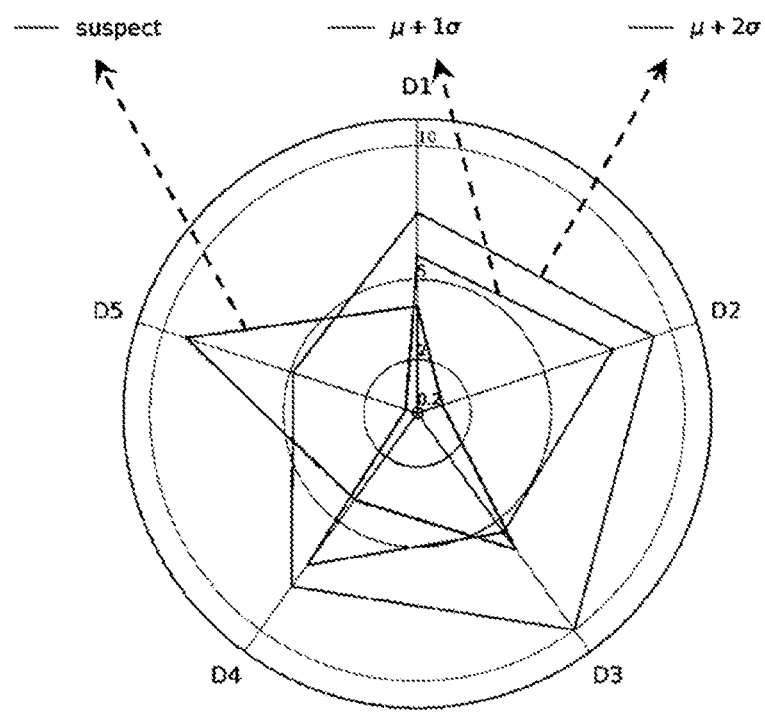

FIGS. 4A through 4C are the use cases illustrating the spider charts for the behavior of a normal individual (FIG. 4A), an anomalous behavior with respect to self (FIG. 4B) and suspect's behavior validation with community (FIG. 4C) on multiple dimensions, according to some embodiments of the present disclosure. The dimensions include D1) Device session frequency, D2) External emails, D3) File copy session, D4) All emails, and D5) Logon session. The three polygons in FIGS. 4A through 4C represent actual behavior, mean±1 ($\mu+1\tau$) standard deviation and mean±2 ($\mu+2\sigma$) standard deviation.

FIGS. 5A through 5B are the use cases illustrating a communication graph with a plurality of communities, according to some embodiments of the present disclosure. Referring to FIG. 5A, the node with star shape represents the insider, and the nodes with rectangle shape represents the potential target. The arrow on lines represents the direction of influence and the optimal path for each star and rectangle node pair. Further, the solid black directed edge between vertices represents reporting hierarchy. The dotted directed edge between vertices represents strong interpersonal relationship, and dash-dotted directed edge between vertices represent weak or one-sided interpersonal relationship. Finally, other edges represent acquaintance. Referring to FIG. 5B, the insider is represented by the star node where influence radius of v for 4 hops is represented. The reachability from v to other nodes in the community is represented by different shapes of the node which includes hexagon shape representing reachability in 1 hop, pentagon shape representing reachability in 2 hop, square shape representing reachability in 3 hop and triangle shape representing reachability in 4 hops.

FIG. 6 illustrates an average probability of loss with respect to a number of hops for four suspects in the CMU CERT (Carnegie Mellon University, Computer Emergency Response Team) dataset, according to some embodiments of the present disclosure. The items CCL0068, KPC0073, MAS0025 and JTM0023 in the legend of the FIG. 6 are the four known insiders in CMU CERT (Carnegie Mellon University, Computer Emergency Response Team) dataset. Further, FIG. 6 depicts the change in average probability of loss $P_s$ with the number hops to reach a target device or the one or more individuals wherein it is observed that with increase in number of hops the probability keeps on decreasing. For example, on CMU CERT (Carnegie Mellon University, Computer Emergency Response Team) dataset the average probability of loss $P_s$ is nearly 0 in 2 hops.

Table 2 represents Indirect impact of an insider on the enterprise assets on the CMU CERT (Carnegie Mellon University, Computer Emergency Response Team) dataset

| Hops | Affected Colleagues | Assigned | Shared | Devices |
|---|---|---|---|---|
| 1 | 39 | 40 | 77 | 117 |
| 2 | 55 = 39 + 16 (New) | 56 | 78 | 134 |

The present disclosure provides system and method for assessing insider influence on enterprise assets that includes monitoring susceptible individuals within the team/project (subgraph of enterprise network graph). In another use-case, when the one or more individuals in the enterprise resigns, the enterprise applies multiple restrictions to avoid data exfiltration during the notice period. However, the one or more individuals can still exploit the influence on other individuals to get the desired impact of exfiltrating sensitive enterprise data. Further, the deployment of licensed security controls for restricting data leakage can be prioritized according to the influence and spread of a potential threat, thus resulting in better inventory management of security controls. The present disclosure further enables introducing corrective behavioral nudges for hardening the human component in cybersecurity for influence based social engineering attacks. Further, the corrective behavioral nudges can be enabled by running a minimal agent on the one or more individual's device which alerts her/him/them of a potential breach due to data sharing with a suspected individual or ask the one or more individuals to get more information from the requester regarding the need-to-know.

Hence, the present disclosure provides the system and method for assessing insider influence on enterprise assets. The present disclosure enables the detection of an insider's influence over other individuals in a team in an enterprise. For a given community (usually a project team), the present system calculates the susceptibility of an individual for probable influence by the one or more identified relevant insiders as a function of their position in reporting hierarchy and the health of communication (indicating the strength of interpersonal relationship). Further, the present disclosure uses various types of relationships existing between the one or more individuals in the enterprise so as to assess the one or more relevant insider's potential influence over his/her/ their peers, subordinates and supervisors. For example, reporting hierarchy relationship existing between the employee, interpersonal relationships based on health of communication between them, relationships based on co-author on a paper, casual/weak relationships due to mere acquaintance are some of the examples of interpersonal relationships Further, the results from the spread and influence detection enable identification of the assets which are under possible threat from a suspicious individual. Further, the present disclosure provides a method to calculate the probability of loss of information which in turn helps in calculating the risk profiles. Thus, the present disclosure helps in sharing the analysis report and suggesting a plurality of preventive and corrective measures with various stakeholders.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
receiving, via one or more hardware processors, an enterprise data specific to one or more individuals associated with an enterprise from a plurality of sources, wherein the one or more individuals comprises of at least one of one or more vendors, one or more employees and one or more contractors associated with the enterprise;
pre-processing, via the one or more hardware processors, the received enterprise data to obtain an intermediate common input representation;
creating, via the one or more hardware processors, an enterprise graph between one or more entities from the obtained intermediate common input representation, wherein the one or more entities includes the one or more individuals and one or more assets associated with the enterprise, and wherein the enterprise graph includes a plurality of vertices consisting of the one or more entities associated with the enterprise in a present time period and a past time period, and a plurality of edges between the one or more entities and a plurality of attributes associated with the plurality of vertices and the plurality of edges;
calculating, via the one or more hardware processors, a weight for each of the plurality of edges between any two connected entities based on a plurality of enterprise graph features and the plurality of attributes;
detecting, via the one or more hardware processors, one or more communities of the one or more individuals by using a plurality of graph-based techniques based on the calculated weights of the plurality of edges;
calculating, via the one or more hardware processors, a threshold behavior for the one or more individuals and the one or more detected communities within an observation window by applying a plurality of statistical methods based on the plurality of enterprise graph features and the plurality of attributes;

performing, via the one or more hardware processors, a comparison of the threshold behavior of the one or more individuals calculated within the observation window with a current behavior of the one or more individuals to identify one or more potential insiders;

performing, via the one or more hardware processors, a comparison of the current behavior of the one or more potential insiders and the current behavior of a plurality of individuals of the one or more detected communities to identify the one or more potential insiders as one or more relevant insiders;

calculating, via the one or more hardware processors, a susceptibility of the plurality of individuals for probable influence by the one or more relevant insiders based on an analysis of a plurality of scenarios, wherein the plurality of scenarios includes hierarchy exploitation, relationship exploitation and mixed mode;

calculating, via the one or more hardware processors, a plurality of paths taken by the one or more relevant insiders based on the calculated susceptibility of the plurality of individuals; and performing, via the one or more hardware processors, an analysis of the calculated paths to obtain a probability score indicative of a probable data loss.

2. The processor implemented method of claim 1, wherein the plurality of attributes comprises attributes specific to (i) the one or more assets and (ii) the one or more individuals associated with the enterprise.

3. The processor implemented method of claim 1, further comprising identifying at least a subset of one or more impacting assets from the one or more assets based on the probable data loss.

4. The processor implemented method of claim 3, further comprising estimating risk associated with the one or more impacting assets and obtaining cumulative risk associated with the enterprise based on the probable data loss.

5. The processor implemented method of claim 1, generating an analysis report comprising at least one of: the information of the one or more relevant insiders, the plurality of individuals affected by the one or more relevant insiders, the paths taken by the one or more relevant insiders to influence the plurality of individuals, the susceptibility of the plurality of individuals for probable influence by the one or more relevant insiders, the probability of data loss, the impacting one or more assets and the estimated risk.

6. A system, comprising:
a memory storing instructions;
one or more communication interfaces; and
one or more hardware processors coupled to the memory via the one or more communication interfaces, wherein the one or more hardware processors are configured by the instructions to:
receive an enterprise data specific to one or more individuals associated with an enterprise from a plurality of sources, wherein the one or more individuals comprises of at least one of one or more vendors, one or more employees and one or more contractors associated with the enterprise;
pre-process the received enterprise data to obtain an intermediate common input representation;
create an enterprise graph between one or more entities from the obtained intermediate common input representation, wherein the one or more entities includes the one or more individuals and one or more assets associated with the enterprise, and wherein the enterprise graph includes a plurality of vertices consisting of the one or more entities associated with the enterprise in a present time period and a past time period, and a plurality of edges between the one or more entities and a plurality of attributes associated with the plurality of vertices and the plurality of edges;
calculate a weight for each of the plurality of edges between any two connected entities based on a plurality of enterprise graph features and the plurality of attributes;
detect one or more communities of the one or more individuals by using a plurality of graph-based techniques based on the calculated weights of the plurality of edges;
calculate a threshold behavior for the one or more individuals and the one or more detected communities within an observation window by applying a plurality of statistical methods based on the plurality of enterprise graph features and the plurality of attributes;
perform a comparison of the threshold behavior of the one or more individuals calculated within the observation window with a current behavior of the one or more individuals to identify one or more potential insiders;
perform a comparison of the current behavior of the one or more potential insiders and the current behavior of a plurality of individuals of the one or more detected communities to identify the one or more potential insiders as one or more relevant insiders;
calculate a susceptibility of the plurality of individuals for probable influence by the one or more relevant insiders based on an analysis of a plurality of scenarios, wherein the plurality of scenarios includes hierarchy exploitation, relationship exploitation and mixed mode;
calculate a plurality of paths taken by the one or more relevant insiders based on the calculated susceptibility of the plurality of individuals; and
perform an analysis of the calculated paths to obtain a probability score indicative of a probable data loss.

7. The system of claim 6, wherein the plurality of attributes comprises attributes specific to (i) the one or more assets and (ii) the one or more individuals associated with the enterprise.

8. The system of claim 6, wherein the one or more hardware processors are further configured to identify at least a subset of one or more impacting assets from the one or more assets based on the probable data loss.

9. The system of claim 8, wherein the one or more hardware processors are further configured to estimate risk associated with the one or more impacting assets and obtaining cumulative risk associated with the enterprise based on the probable data loss.

10. The system of claim 6, wherein the one or more hardware processors are further configured to generate an analysis report comprising at least one of: the information of the one or more relevant insiders, the plurality of individuals affected by the one or more relevant insiders, the paths taken by the one or more relevant insiders to influence the plurality of individuals, the susceptibility of the plurality of individuals for probable influence by the one or more relevant insiders, the probability of data loss, the impacting one or more assets and the estimated risk.

11. One or more non-transitory machine-readable information storage mediums comprising one or more instructions which when executed by one or more hardware processors cause:

receiving, via the one or more hardware processors, an enterprise data specific to one or more individuals associated with an enterprise from a plurality of sources, wherein the one or more individuals comprises of at least one of one or more vendors, one or more employees and one or more contractors associated with the enterprise;

pre-processing, via the one or more hardware processors, the received enterprise data to obtain an intermediate common input representation;

creating, via the one or more hardware processors, an enterprise graph between one or more entities from the obtained intermediate common input representation, wherein the one or more entities includes the one or more individuals and one or more assets associated with the enterprise, and wherein the enterprise graph includes a plurality of vertices consisting of the one or more entities associated with the enterprise in a present time period and a past time period, and a plurality of edges between the one or more entities and a plurality of attributes associated with the plurality of vertices and the plurality of edges;

calculating, via the one or more hardware processors, a weight for each of the plurality of edges between any two connected entities based on a plurality of enterprise graph features and the plurality of attributes;

detecting, via the one or more hardware processors, one or more communities of the one or more individuals by using a plurality of graph-based techniques based on the calculated weights of the plurality of edges;

calculating, via the one or more hardware processors, a threshold behavior for the one or more individuals and the one or more detected communities within an observation window by applying a plurality of statistical methods based on the plurality of enterprise graph features and the plurality of attributes;

performing, via the one or more hardware processors, a comparison of the threshold behavior of the one or more individuals calculated within the observation window with a current behavior of the one or more individuals to identify one or more potential insiders;

performing, via the one or more hardware processors, a comparison of the current behavior of the one or more potential insiders and the current behavior of a plurality of individuals of the one or more detected communities to identify the one or more potential insiders as one or more relevant insiders;

calculating, via the one or more hardware processors, a susceptibility of the plurality of individuals for probable influence by the one or more relevant insiders based on an analysis of a plurality of scenarios, wherein the plurality of scenarios includes hierarchy exploitation, relationship exploitation and mixed mode;

calculating, via the one or more hardware processors, a plurality of paths taken by the one or more relevant insiders based on the calculated susceptibility of the plurality of individuals; and performing, via the one or more hardware processors, an analysis of the calculated paths to obtain a probability score indicative of a probable data loss.

12. The one or more non-transitory machine readable information storage mediums of claim 11, wherein the plurality of attributes comprises attributes specific to (i) the one or more assets and (ii) the one or more individuals associated with the enterprise.

13. The one or more non-transitory machine readable information storage mediums of claim 11, wherein the one or more instructions which when executed by the one or more hardware processors further cause identifying at least a subset of one or more impacting assets from the one or more assets based on the probable data loss.

14. The one or more non-transitory machine readable information storage mediums of claim 13, wherein the one or more instructions which when executed by the one or more hardware processors further cause estimating risk associated with the one or more impacting assets and obtaining cumulative risk associated with the enterprise based on the probable data loss.

15. The one or more non-transitory machine readable information storage mediums of claim 11, wherein the one or more instructions which when executed by the one or more hardware processors further cause generating an analysis report comprising at least one of: the information of the one or more relevant insiders, the plurality of individuals affected by the one or more relevant insiders, the paths taken by the one or more relevant insiders to influence the plurality of individuals, the susceptibility of the plurality of individuals for probable influence by the one or more relevant insiders, the probability of data loss, the impacting one or more assets and the estimated risk.

* * * * *